H. G. GEISSINGER.
REMOTE TEMPERATURE CONTROL.
APPLICATION FILED SEPT. 24, 1910.
1,022,189.
Patented Apr. 2, 1912.
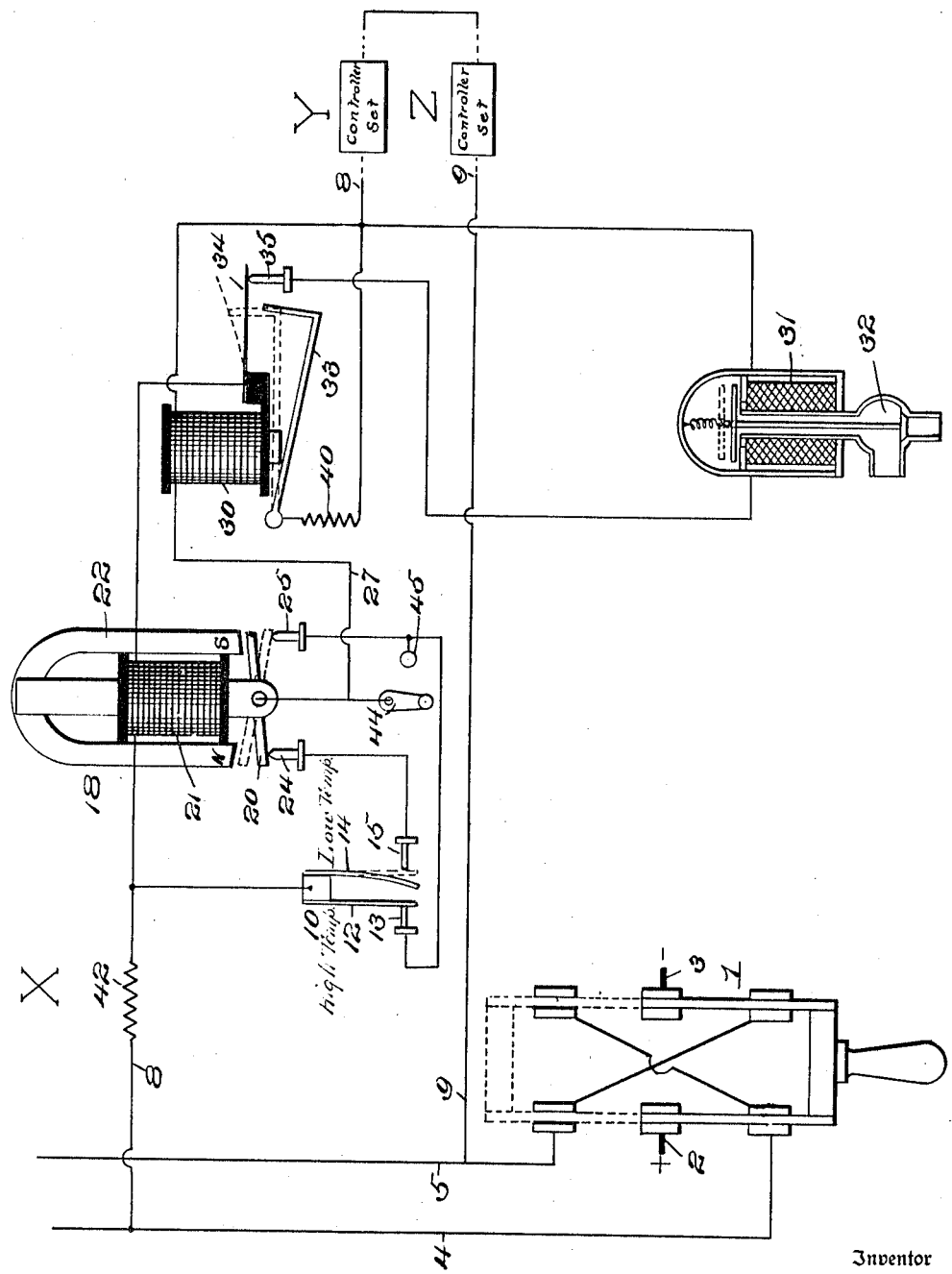

UNITED STATES PATENT OFFICE.

HARRY G. GEISSINGER, OF NEW YORK, N. Y., ASSIGNOR TO GEISSINGER REGULATOR COMPANY, OF NEW YORK, N. Y., A CORPORATION OF NEW YORK.

REMOTE TEMPERATURE CONTROL.

1,022,189.  Specification of Letters Patent.  Patented Apr. 2, 1912.

Application filed September 24, 1910. Serial No. 583,055.

*To all whom it may concern:*

Be it known that I, HARRY G. GEISSINGER, a citizen of the United States, residing at New York, in the county of New York and State of New York, have invented new and useful Improvements in Remote Temperature Control, of which the following is a specification.

My invention relates to means for regulating the temperature in a room or a series of rooms or apartments in which different normal temperatures are required at different times, and it is particularly adapted to the heating of that class of buildings which are largely unoccupied at night and at that time may be maintained at a low temperature.

One of the principal objects of my invention is to provide a system of double temperature control which will automatically maintain any desirable temperature during the day time or period of occupancy and any desired safe low temperature during the night or unoccupied period, and to permit the change of the automatic control of normal high to normal low temperature to be made from the engine-room or other central position.

Another feature of my invention is to permit any room of the system to remain under normal high temperature control while the remainder are under normal low temperature control.

Mainly for purposes of economy in fuel consumption, it is the practice to allow the fires in the heating furnaces of buildings to go down at night with the object of keeping only sufficient heat in the rooms to avoid any danger of freezing. There are a number of difficulties encountered when this plan is adopted. In the first place, it does not provide for supplying a sufficient amount of heat to any rooms or apartments which may be occupied regularly or occasionally. If sufficient heat were maintained in the system for this purpose, then the entire building would be heated with the consequent waste of fuel. Again if an attempt is made to let the fires chill until the temperature throughout the system reaches the desired minimum temperature then there is the added danger that some portion of the system will become too cold and, in severe weather, the pipes in the more exposed part of the building may become frozen.

To overcome the difficulties above described, I provide a system in which sufficient energy is maintained in the furnace or furnaces to supply any desired amount of heat to those portions of the system which are occupied, while the heat energy is conserved and the fuel economized by reason of the fact that the unoccupied portions of the building demand only a sufficient amount of heat energy to maintain a definite safe minimum low temperature.

The advantages and flexibility of my system will be apparent from the following description in connection with the accompanying drawing which illustrates diagrammatically one embodiment of my invention.

I place in each room or apartment whose temperature is to be regulated, a double thermostat and control the respective circuits by means of a polarized relay having an armature whose position depends upon the direction of current flowing through the magnet coil.

In the drawings, I have shown a double-throw, two-pole switch 1, connected to the supply conductors 2, 3, and controlling the polarity of the current supplied to the mains 4, 5, which may be a part of the wiring system of the building. The leads 8, 9, constitute the group control circuit in which are connected in series relation, the temperature controlling devices for a group or series of rooms or apartments indicated at X, Y, Z. Each temperature controlling set includes a double thermostat 10, having a thermal bar or strip 12 adapted to make contact with its contact stud 13 when the temperature is below a certain maximum normal high temperature, and a thermal bar or strip 14, adapted to make contact with its contact stud 15, when the temperature falls below a certain normal minimum low temperature. Coöperating with the thermostat is the relay 18 which controls the divided circuit leading from the contact studs 13 and 15, placing either the high or the low temperature thermostat bar in control of the temperature, according to the position of the armature 20 which is centrally pivoted and adapted to make contact with one or the other of the contact studs 24, 25.

Any type of polarized magnet may be employed. I have illustrated one in which the energizing coil 21 is embraced by a permanent magnet 22.

A conductor 27 is connected to the armature 20 and includes in its circuit the coil of relay 30 which controls the operation of the actuating coil 31 of the valve 32, in the steam pipe leading to the heaters. When the parts are in the position shown, the relay is deënergized and its armature 33, drops into the lower position, permitting the spring arm 34 to contact with the stud 35 and close the circuit from the leads 8, 9, through the coil 31 of the valve 32 and forcing the valve disk upon its seat, thereby shutting off the heat from the apartment. When the relay 30 is energized, its armature will be attracted into the dotted line position, thereby breaking the circuit at the contact stud 35. The current through the leads 8, 9 and polarized magnet is maintained, however, and now passes through the relay armature and resistance 40, equal to that of the valve coil 31, and thereby maintaining a constant current in the leads.

The operation of my system of remote temperature control will be understood from the foregoing description. With the parts in the positions illustrated, the switch 1, connects the main 4 to the positive side and the main 5 to the negative side of the supply conductors, causing the armature 20 of the polarized relay to contact with the stud 24 and place the low temperature thermal bar 14 in control. As shown, the temperature is above the normal critical value and the bar 14 is separated from its contact, opening the circuit through the relay 30, causing the circuit to be closed through the coil 31 of the valve and thereby shutting off the steam.

It is to be understood that the leads 8, 9, are continued through the several apartments of the group or series connecting with the respective controlling coils. If the leads are supplied with current at 110 volts, it is convenient to connect as many as eight sets of controls to one circuit, computing the coils so that their combined resistance permits a current of $\frac{1}{3}$ ampere to flow. If less than 8 controlling sets are connected in one circuit, the same current may be maintained by inserting a compensating resistance 42. Under these conditions the shunt circuit through the thermostat diverts a current of only about $\frac{1}{20}$ ampere. If, while the polarity of the mains is such that the polarized relays place the thermostats in the several apartments under low temperature control it is desired to permit an occupant to place any one or more compartments under the high temperature control, the control may be diverted from the polarized magnet by means of a switch 44. When the switch arm is thrown against its contact stud 45, a circuit is established through the thermal bar 12, placing the relay 30, under high temperature control. If this were done and the parts were as illustrated, it is evident that the relay 30 would be immediately energized, attracting its armature and diverting the current from the coil 31 of valve 32, permitting the valve disk to open and allow steam to enter the heating coils. This feature of my system which provides a means for nullifying the controlling effect of the polarized magnet in any particular control set so that one or any number of apartments may be individually placed under high temperature control while the group is under normal low temperature control, is exceedingly important and overcomes one of the greatest defects in prior temperature control systems.

In order to change the entire group of controls connected to the leads 8, 9, from low temperature control to normal high temperature control, is merely necessary for the engineer to throw over the double pole switch 1 into the dotted line position, thereby reversing the polarity of the mains 4, 5, which causes each of the polarized relays to shift its armature into dotted line position. It is evident that this breaks the circuit through the low temperature thermal bar 14 and establishes the circuit through the high temperature bar 12, the thermostat thereafter maintaining normal high temperature control over the steam valve 32 through the medium of the relay 30.

The advantages of my remote temperature control system will be especially appreciated by heating engineers who are familiar with the inherent difficulties of those systems employing a single thermostatic control and the prior attempts to economize in the consumption of fuel by lowering the temperature of a building during the periods when the rooms were unoccupied, with the attendant dangers of frozen pipes during severe weather. Moreover, in such prior systems, as I have pointed out, it is impossible to provide sufficient heat to any particular room, or apartment when desired by an occupant, during such period of reduced temperature throughout the systems. The flexibility and simplicity of my system will also appeal to engineers.

While I have described a particular arrangement and construction of apparatus for purposes of illustration, it will be understood by those skilled in the art that many changes may be made therein without departing from the invention claimed herein.

I claim:—

1. A system of temperature control comprising an electro-magnetic mechanism for regulating a heating medium, a relay controlling said mechanism, a thermostat having a plurality of thermal elements, a polarized magnet having an armature arranged to connect said relay with one or another of said thermal elements, and means for reversing the polarity of current supplied to said magnet.

2. A system of temperature control, comprising mechanism for regulating a heating medium, a controller for said mechanism, a thermostat having a plurality of thermally-actuated elements, an electromagnetic device for placing said controller under the directing influence of one or another of said thermal elements, and means for nullifying the effect of said device.

3. In a system of temperature control, comprising a plurality of sets of controlling mechanism, each mechanism comprising a valve for controlling a heating medium, a relay controlling said valve, a thermostat having thermal elements responding to different degrees of heat, and a polarized magnet operating to connect said relay in circuit with one or another of said thermal elements, of an electric circuit connected to each of said magnets, and a switch for changing the polarity of the current supplied to said circuit.

4. In a system of temperature control, comprising a plurality of sets of controlling mechanism, each mechanism comprising a valve for controlling a heating medium, a relay controlling said valve, a thermostat having thermal elements responding to different degrees of heat, and a polarized magnet operating to place said relay in circuit with one or another of said thermal elements, of an electric circuit connected to each of said magnets, a switch for changing the polarity of the current supplied to said circuit, and an auxiliary switch associated with each relay adapted to connect one of the thermal elements directly thereto.

5. In a system of temperature control, comprising a plurality of sets of controlling mechanism, each mechanism comprising a regulator for a heating medium, a relay controlling said regulator, a thermostat having thermally-actuated elements responding to different degrees of heat an electro-responsive device operating to place said relay in circuit with one or another of said thermally-actuated elements, and means for simultaneously actuating said electro-responsive devices.

6. In a system of temperature control, comprising a plurality of sets of controlling mechanism, each mechanism comprising a regulator for a heating medium, a relay controlling said regulator, a thermostat having thermal elements responding to different degrees of heat and an electro-responsive device operating to place said relay in circuit with one or another of said thermal elements, of means for simultaneously actuating said electro-responsive devices, and auxiliary devices associated with the respective relays for nullifying the directing effect of the corresponding electro-responsive device and placing the relay under the control of the desired thermal element.

7. In a system of temperature control, comprising a plurality of sets of controlling mechanism, each mechanism comprising a regulator for a heating medium, a controller for said regulator, a thermostat having a plurality of thermal elements, a directing device for placing said controller under the influence of one or another of said thermal elements, and means for causing said directing devices to move simultaneously into one position or another at will.

8. In a system of temperature control, comprising a plurality of sets of controlling mechanism, each mechanism comprising a regulator for a heating medium, a controller for said regulator, a thermostat having a plurality of thermal elements, and a directing device for placing said controller under the influence of one or another of said thermal elements, of means for causing said directing devices to move simultaneously into one position or another at will, and means for nullifying the effect of any particular directing device and placing the corresponding controller under the influence of the desired thermal element.

In testimony whereof I have hereunto set my hand in presence of two subscribing witnesses.

HARRY G. GEISSINGER.

Witnesses:
 M. GOLDSTEIN,
 LUCY M. HUGGINS.